United States Patent Office 2,778,729
Patented Jan. 22, 1957

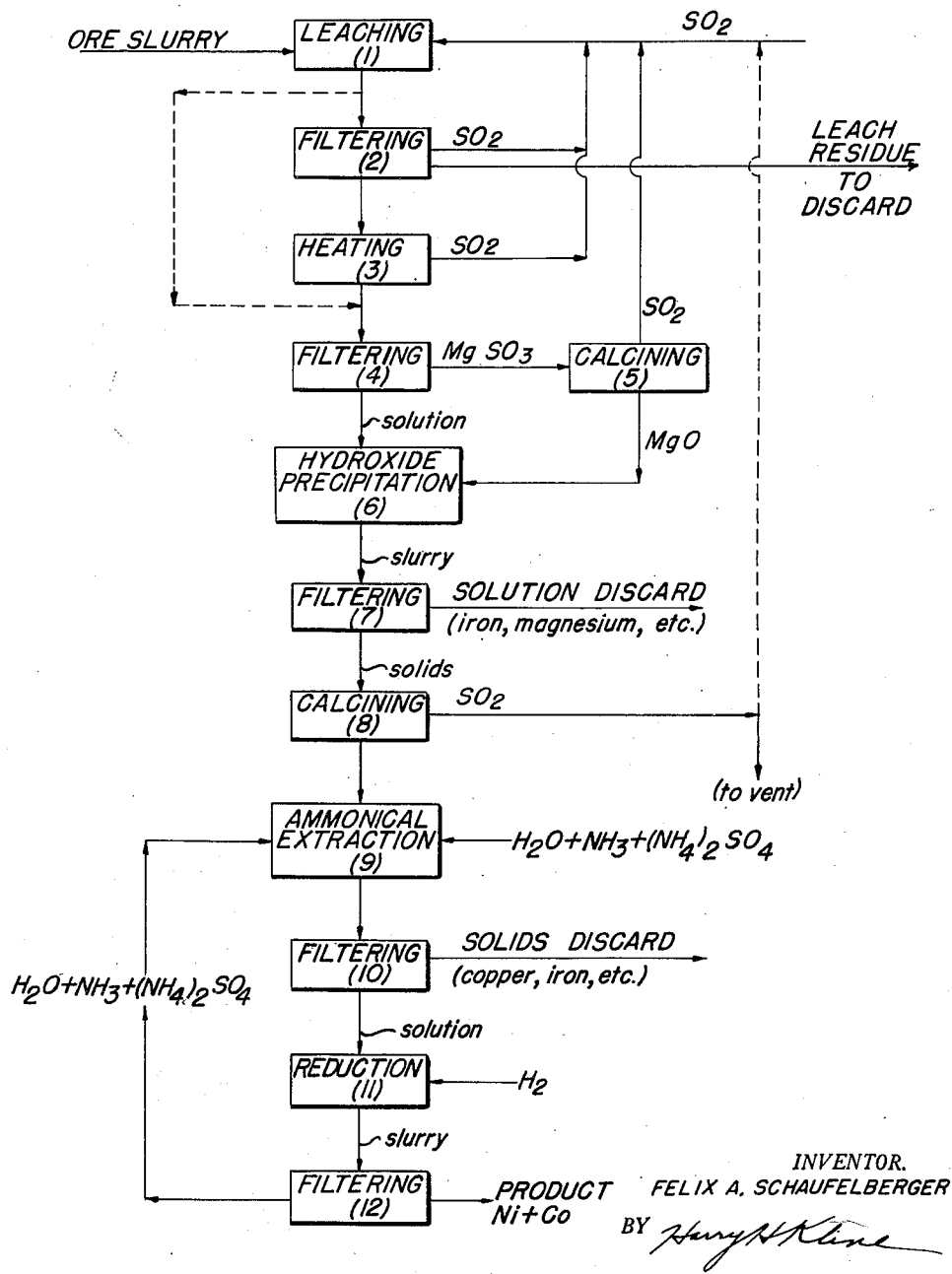

2,778,729
RECOVERY OF NICKEL AND COBALT VALUES FROM GARNIERITE ORES

Felix A. Schaufelberger, Stamford, Conn., assignor to Chemical Construction Corporation, New York, N. Y., a corporation of Delaware Application August 16, 1954, Serial No. 450,274

7 Claims. (Cl. 75—119)

This invention relates to a process of recovering non-ferrous metals such as nickel, cobalt or copper from garnierite ores. More particularly, it relates to the utilization of a sulphur dioxide leach liquor to recover non-ferrous metal values from unreduced and unroasted garnierite ores.

Garnierite ores are generally regarded as hydrated magnesium silicates in which variable proportions of magnesium are replaced by another metal. Nickel, which may be taken as an illustrative example, may be present in such ores in the form of a complex nickel-magnesium silicate. Recovery of such nickel from low-grade nickel garnierite ores also furnishes a good example of the serious problems which the present invention is intended to solve and will be so discussed here.

In the past, such mineral concentration methods as froth flotation, gravity concentration and the like have proved to be inadequate because the nickel values are too finely disseminated through the ore. For the same reason, attempts which have been made to float nickel values after reduction roasting of garnierite ore have not proved too satisfactory. Smelting of these ores is not economically practical because of the excessive temperature and fuel requirements. Moreover, in addition to nickel values, such ores ordinarily contain not only the magnesium but such metals such as manganese, iron, cobalt and copper, also in some complex silicate form.

Nor has leaching of such ores been found useful. Alkaline and ammonical solutions have little effect. Because nickel is not selectively soluble in acid solutions, the presence of the other metals render ordinary acid leaching methods commercially unattractive due to the excessive acid consumption. Of all these prior art methods, none is entirely satisfactory.

In the past, it has also been proposed to leach roasted garnierite ores with sulphur dioxide liquor. However, as an essential step in this process, the ore must be roasted under reducing conditions at temperatures of from 800° C. to 1000° C. to convert the complex nickel-silicate in the ore to nickel metal and then leach the nickel with sulphur dioxide liquor. This process is not commercially attractive, since the ore must be dried prior to the reducing roasting operation. The drying of a garnierite ore presents serious problems. First, these ores have the unpleasant faculty of retaining fairly large percentages of moisture and due to their clay-like nature, present difficult handling, conveying and feeding problems. Secondly, in rotary dryers they have a tendency to form mud rings which can completely block the entire diameter of the dryer. Thirdly, a very appreciable percentage of the dried material is finely divided, even before grinding, so that the gas velocities within the dryer cause excessive dust losses. Furthermore, too high a contact temperature between the combustion gases and the wet ore will cause a surface drying and the formation of a relatively non-porous structure so that the interior of the larger pieces is not adequately dried. The failure to dry the ore satisfactorily causes serious difficulties in attempts to convey pneumatically the supposedly dry material. The presence of even as little as 3.5% moisture causes pneumatic conveying equipment to foul and clog. These operations are all costly and difficult to carry out successfully.

It is, therefore, a principal object of the present invention to devise a process which will overcome the difficulties of the prior art. It is a further object to leach garnierite ores directly without prior drying and roasting. It is a still further object to recover and reuse a major portion of sulphur in the form of sulphur dioxide as the leaching agent.

The accompanying flow sheet graphically illustrates the overall process of the invention. It also depicts a closed cycle wherein both sulphur as sulphur dioxide and nickel and/or cobalt metal in substantially pure form are recovered.

In general, the above objects are accomplished in a surprisingly simple manner. Briefly, the invention contemplates leaching nickel, as illustrative of non-ferrous metal values, from a magnesium silicate mineral such as garnierite with an aqueous sulphur dioxide liquor; clarifying leach-liquor, preferably after first removing residual solids and heating the liquor to precipitate additional solids, including magnesium salts; adjusting the pH of clarified liquor to precipitate nickel as an oxide and recovering the illustrative nickel from the precipitate.

Particular features of the present invention are the elimination of ore drying and the high recovery of nickel and/or cobalt.

In general, an aqueous slurry of unroasted, unreduced magnesium silicate ore such as a garnierite ore is treated at elevated temperature with a stoichiometric excess of sulphur dioxide gas, usually under pressure. Insolubles such as silica are usually filtered out and filtrate is again heated, whereby about 40%–60% of the dissolved magnesium, principally as a sulphite, precipitates and sulphur dioxide is evolved. The evolved sulphur dioxide is recovered and recycled to leaching. Magnesium-containing precipitate is collected and calcined, the magnesium oxide and sulphur dioxide produced thereby being recovered for further utilization in the overall operation. The filtrate is subjected to hydroxide precipitation, as for example, by treatment with alkali, lime, recovered magnesium oxide or the like to produce a pH of about 7 or more and form a precipitate containing the non-ferrous metals, presumably as their hydroxides. The precipitate is collected and treated to redissolve the nickel and other metal values. Preferably, the precipitate is extracted at an elevated temperature with an ammonia-ammonium sulphate liquor to selectively leach out nickel and/or cobalt.

The success of the above outline procedure is indeed surprising and unexpected since it was previously considered that nickel and/or cobalt values could not be obtained from garnierite ores by a direct leach process.

The principles of the invention will be more fully described with reference to the accompanying drawing which illustrates the over-all process. A good general practice is to prepare an aqueous slurry of an untreated and unroasted ore. The slurry may contain from 2–35% solids, although any solids range may be used, provided sufficient water is present to provide for the total dissolution of the magnesium as the bisulfite. Leaching (1) of the slurry is accomplished by supplying sulphur dioxide gas while maintaining a temperature above room temperature, usually above about 30° C. but preferably not more than about 200° C. A good average temperature range is from about 35° C. to about 125° C. At the lower temperature, leaching can be done in an open vessel. However, SO₂ loss would be excessive. Moreover, the rate of reaction is increased by supplying SO₂ at sufficient pressure to maintain a total pressure in excess of the autogenous pressure. Preferably, but not necessarily, the total pressure should not exceed about 1000 pounds per square inch gauge (p. s. i. g.). A good average operating pressure range is from about 50 to about 300 p. s. i. g. over-pressure of $SO_2$. The time required for effective leaching varies with pressure and temperature conditions from about one half hour to about thirty-six hours. In good practice, temperature and pressure should be selected to complete leaching in two to three hours or less. Excellent extraction is obtainable, for example, if from about 80% to 95% of nickel is obtained as dissolved salts.

In addition to the illustrative dissolved nickel salts, the leach liquor will contain other soluble salts of other metals, such as magnesium, iron and cobalt, or copper if present. The salts exist in admixture, mainly as bisulphites. However, they additionally may exist in minor proportions as sulphites, thiosulphates, thionates, or polythionates. The leach mixture, of course, contains excess sulphur, mainly as sulphur dioxide. The sulphur dioxide is recovered in several simple stages, which recovery and reuse is an essential aspect of the present invention. As shown, the leach mixture is cooled, if necessary, and filtering (2) accomplished preferably by means of vacuum, so as to recover (a) excess sulphur dioxide which is recycled to leaching; (b) a leach residue comprising essentially insoluble silica and (c) a filtrate which is essentially the aqueous soluble nickel, cobalt, magnesium and iron salts, which are mainly in the form of their bisulphite salts.

At this point, advantage is taken of the solubility characteristics of magnesium bisulphite and magnesium sulphite in an aqueous solution. The solubility of magnesium as the bisulphite salt is about 25 gm. Mg per liter of solution at about 80° C. whereas the solubility of the magnesium as magnesium sulphite is about 12 gms. magnesium per liter of solution at 80° C. and about 10 gms. Mg/l. at about 25° C. Thus, the above mentioned filtrate is then heated (3) in a suitable vessel at a temperature of from about 70° C. to about 100° C. for from 10 to 30 minutes to convert the soluble bisulphites into sulphites. Additional sulphur dioxide is recovered in accordance with the equation:

(A) 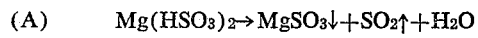$\quad Mg(HSO_3)_2 \rightarrow MgSO_3\downarrow + SO_2\uparrow + H_2O$ Since the filtrate is saturated with respect to magnesium sulphite, all the magnesium in excess of 12 gms. per liter will precipitate from solution. The sulphur dioxide is then recycled to the leaching operation.

The procedural step for precipitating magnesium sulphite is believed to be new and novel in mineral dressing and is highly advantageous in the recovery of the bulk of the sulphur dioxide leach reagent. The latter reagent is recycled and utilized in the leach vessel (1).

The composition of the filtrate, issuing from the filtration step 4, comprises the following metals in the form of their sulphite salts measured approximately in grams per liter (g./l.): Ni plus Co—2 to 5; Fe—10 to 20; Mg—12. The filtrate is then treated with sufficient magnesium oxide in (6) to precipitate nickel, cobalt and iron presumably in the form of their hydroxides. Magnesium will precipitate as its sulphite, since the addition of magnesium oxide is sufficient to increase the concentration of the solution with respect to magnesium. Due to the solubility characteristics of magnesium sulphite noted above, the latter will precipitate. At this point, more than 10 gms. Mg/liter is usually present. As the addition of the magnesium oxide is sufficient to saturate the solution with respect to magnesium, any magnesium in excess of about 10–12 gms./liter precipitates, largely as its sulphite, along with the hydroxides of nickel, cobalt and iron.

Filtering (7) the slurry separates a solution containing very little metal value but about 10–12 gms. of Mg/liter. This solution usually is discarded. Calcining (8) of the precipitate at about 500°–1000° C. yields oxides of nickel and cobalt, iron, magnesium, and copper, if any. Additional sulphur dioxide is released thereby but the amount is relatively small, and it may be discarded or optionally be recycled to leaching (1). Calcine is then treated to recover product Ni or Co.

According to my preferred process calcine is extracted with an aqueous ammonia-ammonium sulphate solution, advantageously at from about 60° C. to about 200° C., to selectively leach Ni and/or Co as a complex ammonium salt. Iron and magnesium oxides remain in the residue and are removed by filtering (10). Reduction (11) of clarified solution with hydrogen precipitates nickel and/or cobalt metal product which is collected by filtering (12) or decantation; resultant ammonia-ammonium sulphate solution is recycled to ammoniacal extraction 9.

As an alternative to sulphur dioxide recovery by vacuum filtration in step 2, the leach mixture may be heated or flashed to recover sulphur dioxide prior to filtration. Another variation for the treatment of the leach mixture is to pressure filter the mixture and then heat the filtrate to flash off sulphur dioxide.

In the process of the flow diagram, leaching (1) is usually done at elevated temperatures and superatmospheric pressure. At such temperatures and pressures, one possible alternative is to eliminate steps 2 and 3 and proceed directly to step 4 as indicated by a dotted line in the drawing, by extending the period of leaching (1) until sufficient magnesium sulphite is precipitated in step 1. However, other minerals, notably silica, are then occluded with the magnesium sulphite. Calcination of such a mixture in step 5 to recover sulphur dioxide becomes complicated and cumbersome. Further, the calcined magnesium oxide, ordinarily used to effect hydroxide precipitation (6) cannot be easily recovered. Accordingly, it is preferred in step 1 to employ those conditions discussed above which do not favor magnesium sulphite precipitation therein. Effective nickel leaching, for example, can be accomplished before magnesium sulphite precipitation becomes troublesome.

The invention is further illustrated by the following examples but it is not to be construed as being limited thereto.

*Example 1*

200 grams of garnierite ore, analyzing as: 1.4% Ni plus Co, 9.8% Fe and 42.4% $SiO_2$, were slurried with 1000 ml. water in a pressure vessel and vigorously stirred at 125° C. for seven hours under an $SO_2$ over-pressure of 175 p. s. i. g. The leach mixture contained approximately 152 gms. sulphur/liter mainly as free $SO_2$ and bisulphites. The leach mixture was conventionally flashed to expel sulphur dioxide and then filtered. The filtrate contained 88% of the Ni plus Co, 96% of the Mg, and 92% of the iron and 80 gms. sulphur/liter. The expelled $SO_2$ was recycled to the leaching operation.

*Example 2*

160 grams of garnierite ore, analyzing as: 1.75% Ni+Co, 12.7% Mg, 15.6% Fe and 30% $SiO_2$, were slurried up in 1000 ml. water in a pressure vessel and stirred at 35° C. and maintained under a $SO_2$ over-pressure of 50 p. s. i. g. for 24 hours. The leach mixture contained approximately 122 gms. sulphur/liter mainly as free $SO_2$ and bisulfite. The leach mixture is then pressure filtered. The filtrate contained 93% of the Ni plus Co, 71% of the Mg and 66% of the Fe. The leach liquor or filtrate is heated to about 70° C. to expel sulphur dioxide. Accordingly, the sulphur content in the filtrate decreased to 67 gms. sulphur/liter.

*Example 3*

100 grams of garnierite ore analyzing as: 2.3% Ni+Co, 11.6% Fe, 17.5% Mg and 37.3% $SiO_2$ were slurried up in 1000 ml. water at 105° C. and a $SO_2$ over-pressure of 160 p. s. i. g. for six hours. The leach mixture contained approximately 130 gms. S/liter mainly as free $SO_2$ and bisulfites. The leach mixture was then vacuum filtered. Sulphur dioxide is expelled and recovered. The filtrate contained 90% of the Ni plus Co, 97% of the Mg, 98% of the Fe and 67 gms. sulphur/liter.

Additionally, in each of the examples above, the following procedural steps were carried out in accordance with my invention. These are the steps of: (I) heating, (II) filtering, (III) magnesium sulphite calcining, (IV) neutralizing, (V) filtering, (VI) calcining and (VII) ammoniacal extraction. The latter step (VII) is not exemplified as it forms no part of the present invention.

Each of the leach liquors or filtrates from Examples 1, 2 and 3 was heated (I) to 90° C. for half an hour, expelling additional sulphur dioxide for recycle or recovery. In this step 40.5 (Example 1), 36.3 (Example 2), 33 (Example 3) grams sulphur/liter had boiled off as sulphur dioxide. The metal bisulfites remaining in solution were also converted to corresponding sulphites. Principally magnesium sulphite precipitated and the precipitate was filtered off (II) at about 25° C. It was found that in Examples 1, 2 and 3, the grams of sulphur per liter remaining in solution was 28.5, 26.4 and 25.4, respectively, whereas 11.0, 4.0 and 9.6 gms. sulphur/liter precipitated as magnesium sulphite in the corresponding examples.

The magnesium sulphite precipitate which contained up to 5% Fe and a trace of Ni plus Co, was then calcined at 650° C. in step (III). This resulted in yields of 13.2, 5.6, 12 gms. of magnesium oxide in Examples 1, 2 and 3, respectively, as well as 22.0, 8.0 and 19.2 gms. sulphur as sulphur dioxide in accordance with equation (A) represented above.

The leach liquor recovered by filtration in step (II) assayed approximately in grams per liter (g./l.) the following:

|  | Ni + Co | Fe | Mg |
|---|---|---|---|
| Example 1 | 2.8 | 20 | 10.5 |
| Example 2 | 3.0 | 19 | 10.5 |
| Example 3 | 2.6 | 14 | 10.5 |

Each solution is neutralized (IV) with 18 (Example 1), 17 (Example 2) and 13 (Example 3) gms./liter of magnesium oxide, the latter being advantageously obtained as noted above. A residue consisting essentially of MgO, $MgSO_3$, $Ni(OH)_2$, $Co(OH)_2$ and $Fe(OH)_2$ and $Fe(OH)_2$ is collected. The mixture is filtered in step (V) and the residue is calcined in step (VI) to recover sulphur dioxide, viz: 12.6, 12.2, and 9.1 gms./liter as sulphur dioxide in Examples 1, 2 and 3 respectively. The filtrate of step (V) contains about 14 gms. S/liter in the form of $MgSO_3$, and is discarded. This amounts approximately to a 10% loss of the original sulphur required by the leach process. The calcined residue can then be ammoniacally leached (VII) to selectively recover nickel and cobalt as metal.

It is quite evident that the sulphur loss in the overall process is small due to the fact that the bulk of the sulphur as sulphur dioxide is removed in the initial operational steps. In addition, the nickel recovery procedure is simplified in that the bulk of the sulfur is not carried along to the final nickel and cobalt value recovery steps.

I claim:

1. A method of treating an unreduced and unroasted garnierite ore containing values in non-ferrous metal silicates which includes: treating an aqueous slurry of said unreduced and unroasted garnierite at a temperature of from about 30° C. to about 200° C. under a positive overpressure of sulphur dioxide gas; maintaining said temperature until reaction substantially ceases; collecting and clarifying resultant acidified liquor; treating clarified liquor with an alkaline material to a pH of at least 7 to precipitate insoluble oxide compounds of said non-ferrous metals; and recovering non-ferrous metals from said precipitate.

2. A method according to claim 1 wherein a sulphur dioxide overpressure of from about 50 to 3000 p. s. i. g. is maintained.

3. A method according to claim 1 wherein a temperature of from about 35° C. to about 125° C. is maintained.

4. In a method of treating an aqueous slurry of an unreduced and unroasted garnierite ore with sulphur dioxide gas and separating values in nickel and cobalt from diluent magnesium and iron in resultant solution, the improvement which comprises: supplying said slurry with sulphur dioxide gas in sufficient amount to produce a positive overpressure while maintaining a temperature of from about 30° C. to about 200° C.; maintaining said temperature and pressure until non-ferrous metal extraction substantially ceases; separating residual solids from resultant leach liquor, whereby a solution is obtained comprising dissolved sulphur-containing salts of nickel, magnesium, iron and salts of cobalt when the ore contains cobalt; treating said solution at a temperature of from about 30° C. to about 200° C. for sufficient time to effect precipitation of magnesium as a sulphite salt in excess of about 10–12 grams of magnesium per liter; and treating resultant liquor to precipitate a mixture containing a major portion of dissolved nickel and cobalt content as insoluble oxides.

5. In a process according to claim 4 wherein sulphur dioxide gas liberated from heating of the solution to precipitate magnesium sulphite is collected and recycled to leaching.

6. In a process of treating an aqueous slurry of unreduced and unroasted garnierite ore with sulphur dioxide gas and separating values in nickel and cobalt from diluent magnesium and iron in solution, the improvement which comprises: supplying said slurry with sulphur dioxide gas in sufficient amount to produce a positive overpressure while maintaining a temperature of from about 30° C. to about 200° C.; maintaining said temperature and pressure until non-ferrous metal extraction substantially ceases; separating residual solids from resultant leach liquor, whereby a solution is obtained comprising dissolved sulphur-containing salts of nickel, magnesium, iron and salts of cobalt when the ore contains cobalt; treating said solution to a temperature of from about 70° C. to about 100° C. for sufficient time to effect precipitation of magnesium as a sulphite salt in excess of 10–12 grams of magnesium per liter; collecting magnesium-bearing precipitate; calcining said precipitate to produce magnesium oxide and sulphur dioxide; collecting said magnesium oxide and treating said solution of reduced magnesium content with collected magnesium oxide to precipitate insoluble oxide compounds of nickel and cobalt.

7. In a process according to claim 6 wherein all sulphur dioxide gas liberated during processing is collected and recycled to leaching.

References Cited in the file of this patent

UNITED STATES PATENTS

| 1,484,818 | Drewsen | Feb. 26, 1924 |
| 2,266,137 | Westby | Dec. 16, 1941 |
| 2,349,223 | Hedley | May 16, 1944 |
| 2,351,780 | Palmrose | June 20, 1944 |

FOREIGN PATENTS

| 2,509 | Great Britain | of 1915 |
| 287,207 | Great Britain | Mar. 8, 1928 |